UNITED STATES PATENT OFFICE.

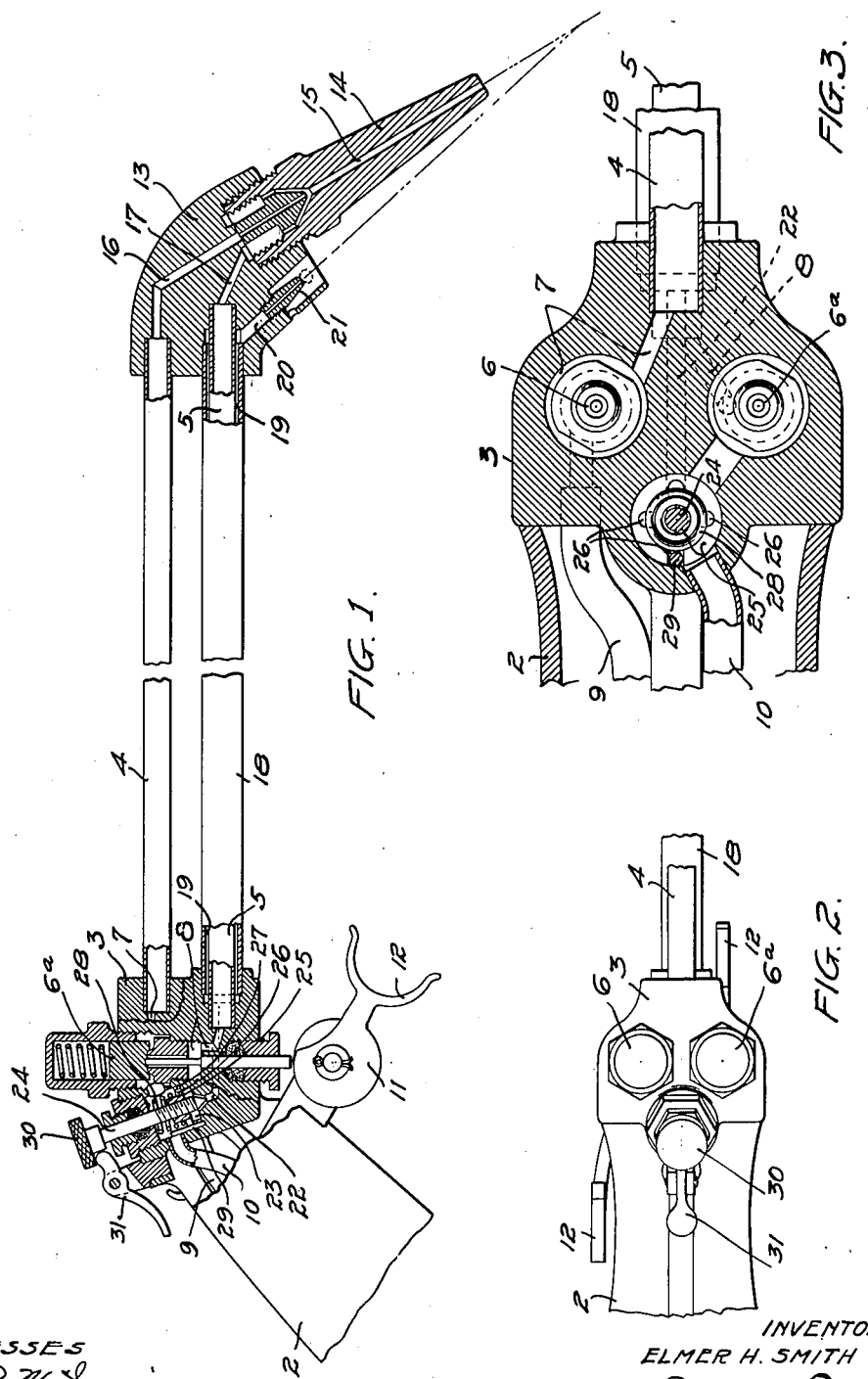

ELMER H. SMITH, OF MINNEAPOLIS, MINNESOTA.

ACETYLENE WELDING-TORCH.

1,280,884. Specification of Letters Patent. Patented Oct. 8, 1918.

Application filed January 21, 1918. Serial No. 213,050.

*To all whom it may concern:*

Be it known that I, ELMER H. SMITH, a citizen of the United States, resident of Minneapolis, county of Hennepin, State of Minnesota, have invented certain new and useful Improvements in Acetylene Welding-Torches, of which the following is a specification.

The object of my invention is to provide a welding torch having a self-contained lighting means which will dispense with the necessity of providing an open flame or other torch lighting means when the operator wishes to make use of the torch.

A further object is to provide a self-contained lighting means which can be conveniently controlled by the hand of the operator on the grip.

Other objects of the invention will appear from the following detailed description.

The invention consists generally in various constructions and combinations, all as hereinafter described and particularly pointed out in the claims.

In the accompanying drawings forming part of this specification,

Figure 1 is a sectional view through the nozzle and valve chamber of a torch embodying my invention, Fig. 2 is a top view of the valve chamber of the torch, Fig. 3 is a plan sectional view through the valve casing.

In the drawing, 2 represents the torch grip, which may be of the pistol or any other preferred form. 3 is the valve casing of the torch, having pipes 4 and 5 mounted therein for the delivery of the oxygen and acetylene gas to the nozzle. The valve casing 3 has valves 6 and 6ª therein which normally close the passages 7 and 8 leading to pipes 4 and 5 from the supply tubes 9 and 10, preferably arranged within the handle 2. These valves are controlled by suitable means such as cams 11 having finger grips 12 and forming the subject matter of a companion application, Serial No. 213,048, filed January 21, 1918, and I therefore do not claim these features in detail in this case. It is sufficient to say that the rotation of the cams regulates the movement of the valves and the delivery of the oxygen and acetylene gas to the pipes 4 and 5.

At the opposite end of the acetylene pipe 5 from the valve casing 3 I provide a nozzle head 13 having a tip 14 provided with a duct 15 which communicates with ducts 16 and 17 leading respectively to the pipes 4 and 5. A similar pipe 18 surrounds the pipe 5 and is spaced from the walls thereof to form an annular passage 19 between them. The passage 19 communicates with a duct 20 that is provided with a small pilot light tip 21 mounted in the nozzle head 13 in position to direct its flame past the orifice of the tip 14 to intersect the flow of the gas therefrom and cause ignition thereof. The opposite end of the passage 19 communicates with a duct 22 which leads to a valve chamber 23 that is provided with a valve 24 threaded into a disk 25 having ports 26 therein for the passage of gas and normally held on a shoulder 27 by the tension of a compression spring 28. By the adjustment of the valve 24 in this disk the passage leading to the duct 22 may be entirely closed or it may be left partially open to form a by-pass for a supply of acetylene gas from the duct 10 above the disk 25, the gas flowing through the ports in the disk down the valve 24 and into the duct 22 and through the passage 19 around the acetylene pipe 5 to the pilot tip, thereby maintaining a flame in the tip when the torch is not in use, as well as when in use.

The valve 24 has a head 30 thereon and a lever 31 is mounted to engage this head and raise the valve against the tension of its spring sufficiently to greatly increase the supply of acetylene gas to the pilot tip and when this has been done the flame will be shot out past the end of the tip 14 and the valves 6 and 6ª having been operated to admit a supply of oxygen and acetylene gas to the tip 14, the flame from the pilot tip will ignite such supply and render the use of the independent flame or any other lighting means entirely unnecessary. As soon as the torch is lighted, the operator will release the lever 31 and thereupon the valve 24 will move to a point where it will almost shut off the flow of acetylene to the pilot tip and the torch may then be used in the ordinary manner.

The supply for the pilot tip will be comparatively small and the consumption of gas when the torch is in use will be scarcely noticed, and the tip may be allowed to burn continuously. Of course, when the day's work is finished, the feed to the pilot light may be entirely shut off by closing the valve 24, but during the day, when the torch is used intermittently, the pilot may be lighted, and may remain so as long as the tool is in use.

The manner of regulating the flow of gas to the pilot and the control therefor may be modified and still be within the scope of my invention.

By mounting this pilot tip in the manner shown I am able to conveniently remove the main torch tip and substitute another therefor and with the pilot tip mounted in the manner shown there is no danger of its becoming damaged from the heat of the flame in the torch tip.

I claim as my invention:

1. An acetylene torch comprising a grip, a valve casing therefor, valves mounted in said valve casing, oxygen and acetylene gas tubes communicating with said valves, a welding tip having pipe connections with said valves respectively for receiving oxygen and acetylene gas therefrom, a pilot light tip adjacent to said torch tip and having a gas supplying passage, said valve casing having a by-pass therein communicating with said passage and with the source of acetylene gas supply, and a valve mounted in said head for increasing or decreasing the flow of acetylene gas through said by-pass.

2. An acetylene torch comprising a grip, a valve casing thereon, valves in said casing communicating with a source of oxygen and acetylene gas supply, a tip having pipe connections with said valve, means for operating said valves with the fingers of the hand on said grip, a pilot light tip adjacent said torch and having a passage leading thereto, said valve casing having a by-pass communicating with said passage and a valve for said by-pass, and a thumb operated lever for opening said valve to increase the flow of gas to said pilot light tip.

3. An acetylene torch comprising a grip, a valve casing having passages communicating with a source of oxygen and acetylene gas supply, valves for said passages, oxygen and acetylene gas pipes communicating with said passages and a torch tip for said pipes, a pilot light tip adjacent said torch tip, a pipe concentric with said acetylene pipe and spaced therefrom to form a passage therethrough, said valve casing having a duct communicating with said passage and with said source of acetylene gas supply, and a valve mounted to normally restrict the flow of gas through said passage to said pilot tip and quickly increase such supply to project the flame of said pilot to a point adjacent the orifice of said torch tip.

4. The combination, with a torch tip, of a pilot light tip mounted in proximity to said torch tip and having a comparatively small discharge passage, means for normally delivering gas to said pilot tip sufficient for a pilot light and increasing such delivery at the will of the operator to project an igniting flame adjacent the orifice of said torch tip.

5. The combination, with a torch tip and gas pipes communicating therewith, of a pilot tip having a supply passage for a limited volume of gas sufficient to maintain a pilot light, and a valve under control of the operator for increasing the supply of gas to said pilot tip to project its flame to intersect the stream of gas discharged from said torch tip.

6. The combination, with an acetylene torch having a tip and pipes for supplying oxygen and acetylene gas to said tip, of a pilot light tip having an acetylene gas supply for maintaining a pilot light when the torch is not in use at a point remote from the orifice of the torch tip, and means for temporarily increasing the supply of gas to said pilot tip to project an igniting flame to a point in proximity to the orifice of said torch tip.

7. In a torch, a head having passages therein and gas pipes communicating with said passages, a torch tip mounted in said head and connected with said passages, a pilot light tip also mounted in said head and having a bypass connection with the gas supply for normally maintaining a small pilot flame in said tip, said pilot tip passage having means for temporarily admitting an increased volume of gas thereto to project an igniting flame to the orifice of said torch tip.

8. The combination, with a torch tip, of a pilot light tip mounted to normally maintain a pilot light at a point remote from said torch tip, and means for temporarily increasing the supply of gas to said pilot tip to project an igniting flame adjacent the orifice of said torch tip.

In witness whereof, I have hereunto set my hand this 4th day of January 1918.

ELMER H. SMITH.